United States Patent
Gulati et al.

(10) Patent No.: US 12,133,261 B2
(45) Date of Patent: Oct. 29, 2024

(54) TECHNIQUES FOR LISTEN BEFORE TALKING (LBT) ACCESS MECHANISMS FOR RADAR SYSTEMS

(71) Applicant: QUALCOMM Incorporated, San Diego, CA (US)

(72) Inventors: Kapil Gulati, Belle Mead, NJ (US); Dan Zhang, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/211,598

(22) Filed: Mar. 24, 2021

(65) Prior Publication Data

US 2021/0315014 A1    Oct. 7, 2021

Related U.S. Application Data

(60) Provisional application No. 63/003,787, filed on Apr. 1, 2020.

(51) Int. Cl.
*H04W 24/10* (2009.01)
*H04W 74/00* (2009.01)
*H04W 74/0808* (2024.01)

(52) U.S. Cl.
CPC ....... *H04W 74/0825* (2013.01); *H04W 24/10* (2013.01); *H04W 74/008* (2013.01)

(58) Field of Classification Search
CPC ... H04W 74/008; H04W 24/10; H04W 24/08; H04W 74/0825; H04W 74/0808
See application file for complete search history.

(56) References Cited

U.S. PATENT DOCUMENTS

| | | | |
|---|---|---|---|
| 2011/0044263 A1* | 2/2011 | El-Saidny | H04W 52/143 370/329 |
| 2016/0173361 A1 | 6/2016 | Somasundaram et al. | |
| 2017/0094681 A1 | 3/2017 | Takeda et al. | |
| 2018/0124790 A1 | 5/2018 | Yerramalli | |
| 2020/0033442 A1* | 1/2020 | Gulati | H04K 1/00 |
| 2020/0209349 A1* | 7/2020 | Shin | G01S 7/038 |
| 2020/0305199 A1* | 9/2020 | Harada | H04W 74/0875 |
| 2021/0068000 A1 | 3/2021 | Tao et al. | |

(Continued)

OTHER PUBLICATIONS

International Search Report and Written Opinion—PCT/US2021/024080—ISA/EPO—Jul. 14, 2021.

*Primary Examiner* — Anez C Ebrahim
(74) *Attorney, Agent, or Firm* — Dalei Dong; Holland & Hart LLP

(57) ABSTRACT

Methods, systems, and devices for wireless communications are described. A wireless device may implement one or more listen before talk (LBT) techniques. The wireless device may identify a set of transmission parameters of a signal for transmission from the wireless device. The wireless device may generate a first transmission waveform of the signal on a set of radio resources based on the set of transmission parameters. The wireless device may perform a LBT based at least in part on the generation of the first transmission waveform. In some cases, performing the LBT includes adjusting a detected signal associated with the set of radio resources based at least in part on the first transmission waveform. The wireless device may transmit the signal based on a result of the LBT.

28 Claims, 10 Drawing Sheets

(56) References Cited

U.S. PATENT DOCUMENTS

| | | |
|---|---|---|
| 2021/0227478 A1 | 7/2021 | Chande et al. |
| 2021/0345406 A1* | 11/2021 | Myung ................. H04L 5/0044 |
| 2021/0352547 A1* | 11/2021 | Chang ................... H04W 16/14 |
| 2021/0352555 A1 | 11/2021 | Fujishiro et al. |

* cited by examiner

TECHNIQUES FOR LISTEN BEFORE TALKING (LBT) ACCESS MECHANISMS FOR RADAR SYSTEMS

CROSS REFERENCE

The present Application for Patent claims the benefit of U.S. Provisional Patent Application No. 63/003,787 by GULATI et al., entitled "TECHNIQUES FOR LISTEN BEFORE TALKING (LBT) ACCESS MECHANISMS FOR RADAR SYSTEMS," filed Apr. 1, 2020, assigned to the assignee hereof, and expressly incorporated by reference herein.

FIELD OF DISCLOSURE

The following relates generally to wireless communications and more specifically to techniques for listen before talking (LBT) access mechanisms for radar systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some systems, a wireless device such as a UE (e.g., a vehicle) may experience interference of signals. As an example, a wireless device may transmit a radar signal and the radar signal may experience interference with another radar signal from another wireless device, which may result in relatively inaccurate and inefficient signaling in a system.

SUMMARY

The described techniques relate to improved methods, systems, devices, and apparatuses that support techniques for listen before talking (LBT) access mechanisms for systems (e.g., radar systems). For example, the described techniques provide for more reliable signaling (e.g., radar signaling, communications, etc.) by enabling a wireless device to implement LBT procedures. The wireless device may perform one or more LBT operations to detect if radio frequency resources are occupied or unoccupied, which may enable the wireless device to avoid interference (e.g., the wireless device may refrain or proceed to transmit a radar signal based on a result of the one or more LBT operations indicating whether a set of resources are clear for transmission). As described herein, the wireless device may perform such LBT operations based on a generated waveform for a signal (e.g., a radar signal), which may result in more accurate interference measurements for signaling over a set of resources. For example, the wireless device may identify a set of transmission parameters (e.g., transmission parameters for a cycle of a frequency modulated continuous wave (FMCW) radar signal) and generate a waveform for a signal in accordance with the parameters. The wireless device may mix the generated waveform with a received energy (e.g., a received energy or detected signal from performing channel sensing over a set of resources) to determine whether a transmission of the signal with the generated waveform would cause or be subject to interference with another signal from another wireless device. In some examples, the LBT procedure may be successful (e.g., an interference measurement may satisfy a threshold) and the wireless device may transmit the signal using the set of transmission parameters. In some other examples, the LBT procedure may fail. In such examples, the wireless device may perform another LBT procedure with a different set of transmission parameters. Additionally or alternatively, the wireless device may select a set of transmission parameters that result in the least interference for transmission (e.g., in the event of LBT failure when a plurality of sets of transmission parameters fail to satisfy a threshold).

A method for wireless communications at a wireless device is described. The method may include generating a first transmission waveform of a first signal on a set of radio resources based on a set of transmission parameters for transmission from the wireless device, performing a LBT using the generated first transmission waveform, and transmitting a second signal based on the set of transmission parameters and a result of the LBT.

An apparatus for wireless communications at a wireless device is described. The apparatus may include a processor, memory coupled with the processor, and instructions stored in the memory. The instructions may be executable by the processor to cause the apparatus to generate a first transmission waveform of a first signal on a set of radio resources based on a set of transmission parameters for transmission from the wireless device, perform a LBT using the generated first transmission waveform, and transmit a second signal based on the set of transmission parameters and a result of the LBT.

Another apparatus for wireless communications at a wireless device is described. The apparatus may include means for generating a first transmission waveform of a first signal on a set of radio resources based on a set of transmission parameters for transmission from the wireless device, means for performing a LBT using the generated first transmission waveform, and means for transmitting a second signal based on the set of transmission parameters and a result of the LBT.

A non-transitory computer-readable medium storing code for wireless communications at a wireless device is described. The code may include instructions executable by a processor to generate a first transmission waveform of a first signal on a set of radio resources based on a set of transmission parameters for transmission from the wireless device, perform a LBT using the generated first transmission waveform, and transmit a second signal based on the set of transmission parameters and a result of the LBT.

Some examples of the method, apparatuses, and non-transitory computer-readable medium described herein may further include operations, features, means, or instructions for performing the LBT includes adjusting a detected signal associated with the set of radio resources based on the first transmission waveform.

Some examples of the method, apparatuses, and non-transitory computer-readable medium described herein may further include operations, features, means, or instructions for processing a detected signal and the first transmission waveform to obtain a measurement, determining that the measurement satisfies a threshold, and identifying the result of the LBT based on the measurement satisfying the threshold.

In some examples of the method, apparatuses, and non-transitory computer-readable medium described herein, the measurement may be less than the threshold and the result of the LBT includes a successful result.

In some examples of the method, apparatuses, and non-transitory computer-readable medium described herein, the measurement may be greater than or equal to the threshold and the result of the LBT includes a failed result.

Some examples of the method, apparatuses, and non-transitory computer-readable medium described herein may further include operations, features, means, or instructions for transmitting the second signal using the first transmission waveform.

Some examples of the method, apparatuses, and non-transitory computer-readable medium described herein may further include operations, features, means, or instructions for identifying a second set of transmission parameters for the first signal from the wireless device, generating a second transmission waveform in accordance with the second set of transmission parameters, performing a second LBT based on generating the second transmission waveform, where performing the second LBT includes adjusting a detected signal associated with the set of radio resources based on the second transmission waveform, and transmitting the second signal using the second transmission waveform based on a successful result of the second LBT.

Some examples of the method, apparatuses, and non-transitory computer-readable medium described herein may further include operations, features, means, or instructions for comparing a measurement of the LBT with a set of measurements associated with a set of LBTs, selecting one or more transmission parameters based on the comparing, and transmitting the second signal in accordance with the selected one or more transmission parameters.

Some examples of the method, apparatuses, and non-transitory computer-readable medium described herein may further include operations, features, means, or instructions for determining that the one or more transmission parameters correspond to a measurement that may be a lowest value of the set of measurements, where selecting the one or more transmission parameters may be based on the determining.

In some examples of the method, apparatuses, and non-transitory computer-readable medium described herein, the set of transmission parameters may be a last set of transmission parameters of a set of multiple sets of transmission parameters.

In some examples of the method, apparatuses, and non-transitory computer-readable medium described herein, performing the LBT may include operations, features, means, or instructions for sensing, during a first time period, a channel associated with the set of radio resources and identifying a detected signal based on sensing the channel, where performing the LBT may be based on the detected signal.

Some examples of the method, apparatuses, and non-transitory computer-readable medium described herein may further include operations, features, means, or instructions for identifying the first time period based on a configuration of the wireless device, information received from another wireless device, a confidence threshold, or any combination thereof.

In some examples of the method, apparatuses, and non-transitory computer-readable medium described herein, transmitting the second signal may include operations, features, means, or instructions for transmitting a frequency modulated continuous wave radar signal.

In some examples of the method, apparatuses, and non-transitory computer-readable medium described herein, the wireless device includes a vehicle.

DETAILED DESCRIPTION

Figure 1:
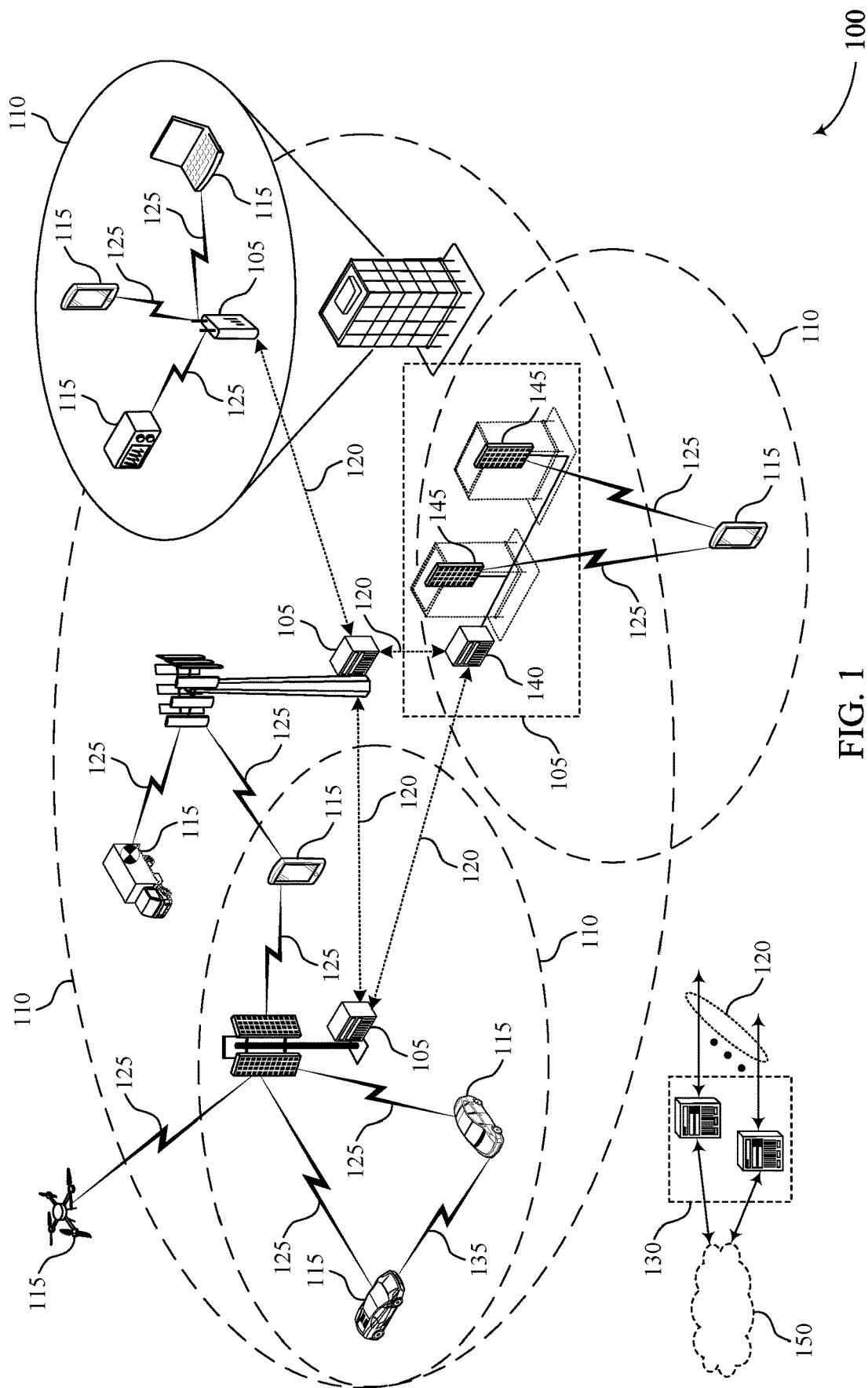
FIG. 1 illustrates an example of a system for wireless communications that supports techniques for listen before talking (LBT) access mechanisms for radar systems in accordance with various aspects of the present disclosure.

Some systems (e.g., wireless communications systems) may implement radar signaling. For example, radar may be used for ranging and other purposes (e.g., environmental and object detection) by transmitting radar signals from a device and observing a reflected (e.g., detected) radar signal in order to estimate properties of nearby targets (e.g., objects, vehicles, people, obstructions, or any other targets). Such properties may include distance, speed, and angular location of the nearby targets. As an example, radar systems may be implemented for detection of aircrafts, ships, vehicles, weather formations, terrains, and other objects. Examples of radar signaling used in such systems may include frequency modulated continuous wave (FMCW) radar signaling, phase modulated continuous wave (PMCW) radar signaling, among other examples of radar signaling. In some examples, radar may be used by wireless devices (e.g., a user equipment (UE), an automobile, or any other wireless devices) as a sensor input which may enable advanced driver assistance systems (ADAS) and automated driving. However, in some cases, radar transmissions from other devices may generate significant interference of signals in the system, which may degrade target detection performance, communications between devices, etc.

According to the techniques described herein, a wireless device such as a UE (e.g., a vehicle) may implement one or more listen before talk (LBT) schemes in a wireless communications system (e.g., a radar system). The wireless device may perform one or more LBT operations to determine if resources are occupied (e.g., detect if there are signals being transmitted by other devices on the resources), which may enable the wireless device to avoid interference. For example, the wireless device may determine to transmit or refrain from transmitting a radar signal based on a result of the one or more LBT operations indicating whether a set of resources are clear for transmission. As described herein, the wireless device may perform such LBT operations based on a generated waveform for a signal that the device intends to transmit on a set of resources, which may result in a more accurate interference measurement for signaling over a set of resources. For example, the wireless device may identify a set of transmission parameters (e.g., "chirp" parameters for a cycle of a FMCW radar signal) and generate a first waveform using the parameters. The wireless device may condition an LBT procedure using the generated first waveform. For example, the wireless device may adjust a detected signal based on the first waveform. Adjusting the detected signal may include mixing a received energy associated with the detected signal and the generated first waveform. An output of the mixing of the detected signal and a waveform may be processed to obtain a measurement of interference (e.g., interference with the detected signal) due to transmitting the waveform on the set of resources.

In some examples, the wireless device may compare the measurement to a threshold and determine that the threshold is satisfied (e.g., a successful result of the LBT procedure). In such examples, the wireless device may transmit the signal using the first waveform in accordance with the set of transmission parameters. In some other examples, the wireless device may compare the measurement to a threshold and determine that the measurement fails to satisfy the threshold (e.g., a failed result of the LBT procedure). In such examples, the wireless device may perform another LBT procedure with a second set of transmission parameters. If the LBT procedure using the second set of transmission parameters (e.g., mixing a second waveform with a detected signal) is successful, the wireless device may transmit the signal in accordance with the second set of transmission parameters. If the LBT procedure using the second set of transmission parameters is not successful, in some examples, the wireless device may select a third set of transmission parameters and attempt LBT access again (and so on, until a successful result is achieved). Additionally or alternatively, the wireless device may select a set of transmission parameters that results in the smallest interference measurement and transmit a waveform corresponding to the selected set of transmission parameters (e.g., in the event of LBT failure when the wireless device determines that none of multiple sets of parameters result in a successful LBT procedure).

Aspects of the disclosure are initially described in the context of wireless communications systems. Aspects of the disclosure are then described in the context of systems and timelines. Aspects of the disclosure are further illustrated by and described with reference to apparatus diagrams, system diagrams, and flowcharts that relate to techniques for LBT access mechanisms for radar systems.

FIG. 1 illustrates an example of a wireless communications system 100 that supports techniques for LBT access mechanisms for radar systems in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

In some examples, the devices in the wireless communications system 100 (e.g., a UE 115 such as a vehicle, a base station 105, etc.) may implement one or more LBT schemes as described herein. For example, a wireless device may perform an LBT procedure to identify if a set of radio frequency resources is occupied (e.g., if another wireless device is utilizing the resources to transmit a signal, such as a radar signal, communications, etc.). The LBT procedure may include performing energy sensing of the resources to determine if the resources are clear for transmission. The wireless device may determine to transmit or refrain from transmitting a signal based on a result of the LBT operation indicating whether a set of resources are clear for transmission.

In accordance with the examples described herein, the wireless device may perform such LBT operations based on a generated waveform for a signal that the device intends to transmit on a set of resources, which may result in more accurate interference measurements for signaling over a set of resources. For example, the wireless device may identify a set of transmission parameters (e.g., "chirp" parameters for a cycle of a FMCW radar signal) and generate a first waveform for transmitting the signal (e.g., a "chirp" radar signal) using the parameters. The wireless device may perform the LBT procedure using the generated first waveform. For example, the wireless device may adjust a detected signal (e.g., a received energy from a channel sensing procedure) based on the first waveform. Adjusting the detected signal may include mixing the first waveform with a received energy associated with the detected signal. An output of the mixing of the detected signal and a waveform may be processed to obtain a measurement of interference (e.g., interference with the detected signal) due to transmitting the waveform on the set of resources.

In some examples, the wireless device may compare the measurement to a threshold and determine that the threshold is satisfied (e.g., a successful result of the LBT procedure). In such examples, the wireless device may transmit the signal using the first waveform in accordance with the set of transmission parameters. In some other examples, the wireless device may compare the measurement to a threshold and determine that the measurement fails to satisfy the threshold (e.g., a failed result of the LBT procedure). In such examples, the wireless device may perform another LBT procedure with a second set of transmission parameters. If the LBT procedure using the second set of transmission parameters (e.g., mixing a second waveform with a detected signal) is successful, the wireless device may transmit the signal in accordance with the second set of transmission parameters. If the LBT procedure using the second set of transmission parameters is not successful, in some examples, the wireless device may select a third set of transmission parameters and attempt LBT access again (and so on, until a successful result is achieved). Additionally or alternatively, the wireless device may select a set of transmission parameters that results in the smallest interference measurement and transmit a waveform corresponding to the selected set of transmission parameters (e.g., in the event of LBT failure when the wireless device determines that none of multiple sets of parameters result in a successful LBT procedure).

Figure 2:
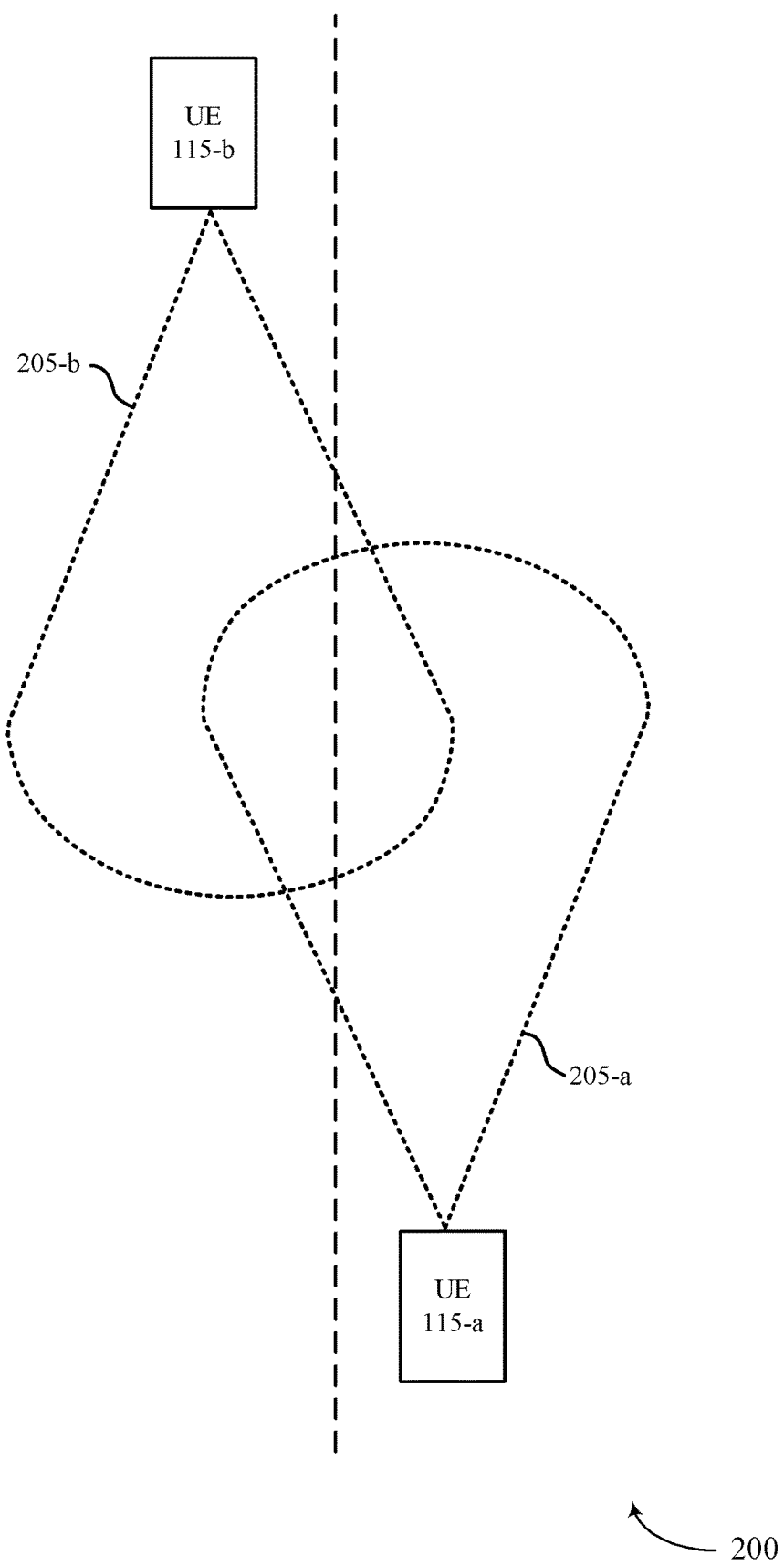
FIG. 2 illustrates an example of a system that supports techniques for LBT access mechanisms for radar systems in accordance with various aspects of the present disclosure.

FIG. 2 illustrates an example of a system 200 that supports techniques for LBT access mechanisms for radar systems in accordance with various aspects of the present disclosure. In some examples, the system 200 may implement aspects of wireless communications system 100. For example, the system 200 may include a UE 115-a and a UE 115-b, which may be examples of UEs 115 or other wireless devices as described with reference to FIG. 1. The system 200 may illustrate an example of an LBT scheme that accounts for a transmission waveform of a signal.

The UE 115-a and the UE 115-b may transmit signals 205-a and 205-b, respectively. For example, the UE 115-a may identify a signal 205-a for transmission. In some cases, the UE 115-a may transmit the signal 205-a in a full duplex mode (e.g., data or radar signals may be transmitted and received simultaneously at the UE 115-a or the UE 115-b). As an illustrative example, the signal 205-a may be an example of a FMCW radar signal, which may enable the UE 115-a with various functionalities (e.g., ranging, environmental and object detection, ADAS, automated driving, etc.). However, in some examples the signal 205-a and the signal 205-b may interfere with each other or other signals 205. For instance, the UE 115-a may be an example of a vehicle moving towards the UE 115-b. The UE 115-b may be transmitting the signal 205-b (e.g., a FMCW radar signal) at a time or on resources that the UE 115-a is transmitting the signal 205-a. In such examples, the signal 205-b may cause relatively strong interference to the signal 205-a from the UE 115-a (e.g., the signal 205-b may block the reception of a reflected signal 205-a), or vice versa, which may degrade ranging accuracy and object detection.

Accordingly, the techniques described herein may enable the UE 115-a and 115-b to implement LBT operations, for example, in a radar system, which may reduce the likelihood of interference in the system 200 and result in more efficient signaling. Additionally or alternatively, the UE 115-a and UE 115-b may implement one or more LBT schemes that account for a waveform. For example, the UE 115-a may perform an LBT procedure based on a generated waveform for the signal 205-a, which may result in relatively more accurate channel occupancy detection.

The UE 115-a may identify a set of transmission parameters for a transmit waveform of the signal 205-a. In some examples, the transmission parameters may be an example of "chirp" parameters for a cycle of a FMCW radar signal. In some examples, the transmission parameters may include a carrier frequency, a bandwidth sweep range (e.g., the waveform may be transmitted across a 1 GHz range, a 1.5 GHz range, among other examples of bandwidth sweep ranges), a sweeping time (e.g., the UE 115-a may complete a bandwidth sweep of the waveform in 2 microseconds, 6 microseconds, 12 microseconds, etc.), a direction of a sweep (e.g., a "chirp" of the waveform may be directed from a 77 degree angle from the UE 115-a to a 78 degree angle from the UE 115-a, or from the 78 degree angle to the 77 degree angle, although any parameter indicating a direction of the sweep may be used), among other examples of transmission parameters. The UE 115-a may utilize the set of transmission parameters to determine (e.g., generate) a first waveform for the signal 205-*a*. For example, the UE 115-*a* may generate an analog transmit waveform but may refrain from transmitting a signal for a time period (e.g., zero power may be implemented with the transmit waveform until completion of an LBT period).

The UE 115-*a* may perform the LBT procedure using the generated waveform. For example, the UE 115-*a* may perform channel sensing on a set of resources (e.g., resources that the UE 115-*a* intends to utilize to transmit the generated waveform), in order to determine if the resources are occupied by the UE 115-*b*. The UE 115-*a* may adjust a detected signal (e.g., a received energy from a channel sensing procedure) based on the generated waveform. Adjusting the detected signal may include mixing the generated waveform with a received energy associated with the detected signal. Additionally or alternatively, adjusting the detected signal may include processing an output (e.g., a mixer output) of the mixture of the waveform and the detected signal. Such processing may include filtering and a fast-Fourier transform (FFT) of the output, which may yield a measurement (e.g., a value such as a peak of a spectrum of the mixture of the waveform and the detected signal). In some examples, the measurement may indicate an interference (e.g., a mutual interference) that may occur between the signal 205-*a* with the generated waveform and the signal 205-*b* from the UE 115-*b*.

In some examples, the UE 115-*a* may compare the measurement to a threshold. For example, the UE 115-*a* may compare a threshold value to a peak value of a spectrum obtained from processing the mixer output of the generated waveform and the received energy on the set of resources. The UE 115-*a* may determine whether the threshold is satisfied based on the comparison. For example, the UE 115-*a* may determine that the LBT procedure was successful (e.g., a result of the comparison of the LBT procedure indicates that transmitting the signal 205-*a* with the generated waveform in accordance with the set of transmit parameters, would result in a relatively low amount of interference with the signal 205-*b*).

Additionally or alternatively, the UE 115-*a* may compare the measurement to the threshold and determine that the measurement fails to satisfy the threshold (e.g., a failed result of the LBT procedure may indicate that transmitting the signal 205-*a* with the generated waveform in accordance with the set of transmit parameters would result in a relatively high amount of interference with the signal 205-*b*). In such examples, the UE 115-*a* may perform another LBT procedure with a second set of transmission parameters. If the LBT procedure using the second set of transmission parameters (e.g., mixing a second waveform, different from the previously generated waveform, with a detected signal) is successful, the UE 115-*a* may transmit the signal 205-*a* in accordance with the second set of transmission parameters. If the LBT procedure using the second set of transmission parameters is not successful, in some examples, the UE 115-*a* may select a third set of transmission parameters and attempt LBT access again (and so on, until a successful result is achieved).

In some examples, the UE 115-*a* may determine that an LBT failure has occurred. For example, the UE 115-*a* may be configured with a threshold quantity of LBT procedures to attempt (e.g., the UE 115-*a* may attempt five LBT procedures with five different sets of parameters, or any other quantity of attempts). Additionally or alternatively, the UE 115-*a* may have attempted LBT procedures for all possible sets of transmission parameters and failed to obtain a successful result for each set of transmission parameters (e.g., each waveform generated for each attempt may result in an interference measurement higher than a threshold). The UE 115-*a* may select a set of transmission parameters that results in the smallest interference measurement (e.g., the set of transmission parameters of one or more LBT procedures that resulted in a smallest peak interference with the signal 205-*b*). The UE 115-*a* may transmit a waveform corresponding to the selected set of transmission parameters.

Figure 3:
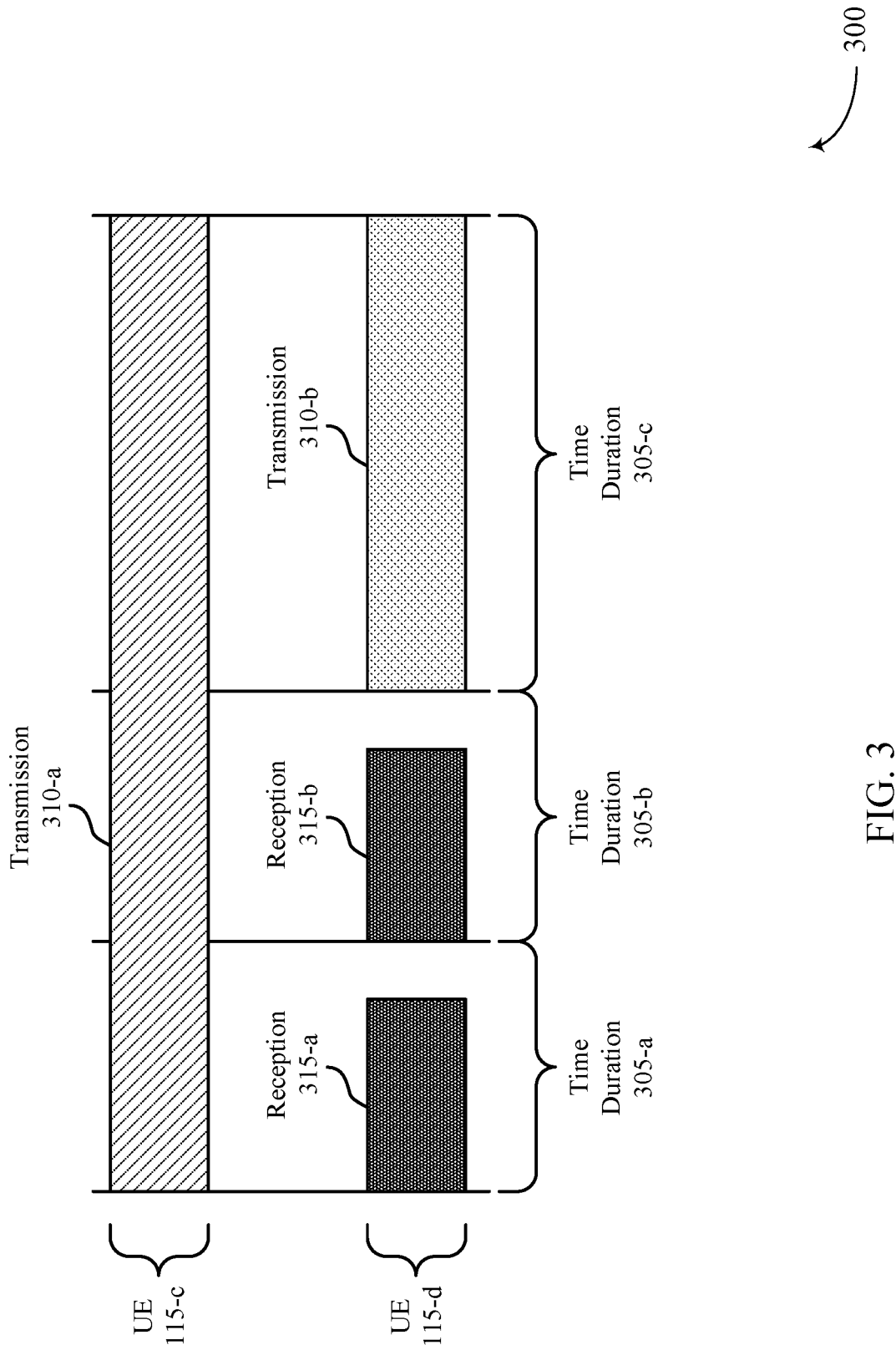
FIG. 3 illustrates an example of a timeline that supports techniques for LBT access mechanisms for radar systems in accordance with various aspects of the present disclosure.

FIG. 3 illustrates an example of a timeline 300 that supports techniques for LBT access mechanisms for radar systems in accordance with various aspects of the present disclosure. In some examples, the timeline 300 may implement aspects of wireless communications system 100. For example, the timeline 300 may illustrate example communications (e.g., radar signaling) of a UE 115-*c* and a UE 115-*d* implementing LBT schemes, which may be examples of the UEs 115 or other wireless devices as described with reference to FIGS. 1 and 2.

The UE 115-*c* may be an example of a wireless device (e.g., a vehicle) occupying a set of resources for the transmission 310-*a*. For example, the UE 115-*c* may transmit a FMCW radar signal across multiple time durations 305, as illustrated. The UE 115-*d* may be an example of a wireless device implementing an LBT scheme as described herein in order to mitigate or avoid interference with the transmission 310-*a*.

For example, the UE 115-*d* may determine a first waveform based on a first set of parameters and perform an LBT procedure during the reception 315-*a* of the time duration 305-*a*. As an example, the UE 115-*d* may generate the first waveform using the first set of parameters for a first signal intended for transmission. The UE 115-*d* may perform the LBT procedure as described herein with reference to FIG. 2. For example, the UE 115-*d* may mix the first waveform with a received energy from sensing a set of resources. The UE 115-*d* may compare an interference measurement to a threshold based on the mixture of the waveform and the received energy. As illustrated in the timeline 300, the UE 115-*d* may determine that the LBT procedure using the first set of transmission parameters (e.g., the first waveform) results in an interference measurement that fails to satisfy the threshold (e.g., a failed result of the LBT procedure). The UE 115-*d* may attempt a second LBT procedure based on the interference measurement failing to satisfy the threshold. For example, the UE 115-*d* may determine a second waveform based on a second set of parameters and perform a second LBT procedure during the reception 315-*b* of the time duration 305-*b*. In some examples, the UE 115-*d* may identify a time period to perform the reception 315-*a* or the reception 315-*b*. For example, the UE 115-*d* may perform an LBT procedure for a time period based on a pre-configuration of the UE 115-*d*. In some examples, the time period may be dynamically determined. For example, the UE 115-*d* may perform reception, such as reception 315-*a* and reception 315-*b*, until a confidence level is satisfied. For example, the UE 115-*d* may perform energy sensing and mix the received energy (e.g., a detected signal) with a generated waveform for a time period until the UE 115-*d* reaches a confidence level (e.g., satisfies a confidence threshold) that the resources are occupied, that the mixture of the received energy and the waveform are above or below a threshold, etc. In some examples, the time duration 305-*a* and the time duration 305-*b* may be different durations (e.g., due to different waveforms being tested, a confidence threshold being satisfied relatively quicker for the time duration 305-*a* than the time duration 305-*b*, among other examples).

As illustrated in the timeline 300, the UE 115-*d* may determine that the second LBT procedure was successful (e.g., an interference measurement using the second waveform satisfies a threshold). The UE 115-*d* may perform a transmission 310-*b* using the second waveform (e.g., in accordance with the second set of parameters) during the time duration 305-*c* based on the successful result of the LBT procedure. For example, the UE 115-*d* may transmit a second signal using a waveform that results in a successful LBT procedure (e.g., the second waveform, the first waveform, or other examples of waveforms).

Figure 4:
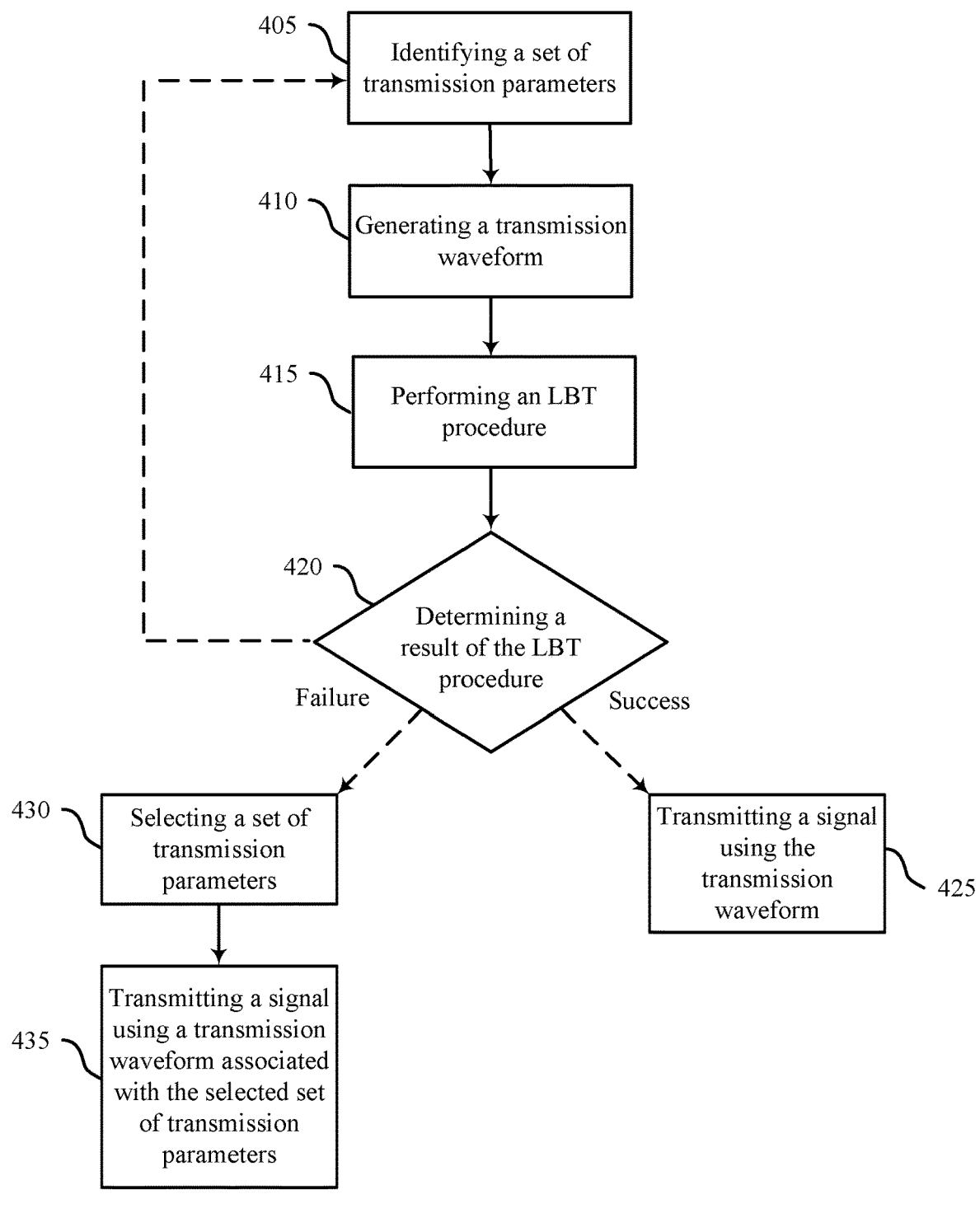
FIG. 4 illustrates an example of a flowchart that supports techniques for LBT access mechanisms for radar systems in accordance with various aspects of the present disclosure.

FIG. 4 illustrates an example of a flowchart that supports techniques for LBT access mechanisms for radar systems in accordance with various aspects of the present disclosure. In some examples, the flowchart 400 may implement aspects of wireless communications system 100. For example, the flowchart 400 may be implemented by a wireless device (e.g., a UE 115) as described with reference to FIGS. 1 through 3.

At 405, the wireless device may identify a set of transmission parameters. The set of transmission parameters may be examples of the transmission parameters described herein with reference to FIGS. 1 through 3. At 410, the wireless device may generate a first transmission waveform of a first signal on a set of radio resources using the set of transmission parameters, for transmission from the wireless device, as described herein with reference to FIGS. 1 through 3.

At 415, the wireless device may perform an LBT procedure as described herein with reference to FIGS. 1 through 3. In some examples, the LBT procedure may use the generated waveform and/or the set of transmission parameters, which may enable more accurate interference measurements (e.g., interference between a signal 205-*a* and a signal 205-*b*, among other examples of interference). For example, the wireless device may process the waveform and received energy from the LBT procedure as described with reference to FIG. 2.

At 420, the wireless device may determine a result of the LBT procedure performed at 415. In some examples, the wireless device may determine that the result is a successful result. In such examples, at 425 the wireless device may transmit a signal on a set of resources using the transmission waveform generated at 410 based on the set of transmission parameters and the successful result (e.g., the wireless device may transmit a second signal using the transmission waveform of the first signal).

In some other examples, the wireless device may determine that the result of the LBT procedure at 415 is a failed result. In some examples, the wireless device may repeat 405 through 420 based on the failed result. For example, the wireless device may attempt LBT access for a different set of parameters and repeat the process until a successful result is obtained. The wireless device may transmit a signal using a waveform and a set of parameters that resulted in a successful LBT procedure. In some examples, the wireless device may determine that LBT failure has occurred, as described with reference to FIG. 2. For example, the wireless device may have exhausted possible sets of parameters (e.g., a configured quantity of LBT attempts have been performed, or multiple possible sets of parameters have resulted in interference measurements that fail to satisfy a threshold). That is, the set of transmission parameters used to generate the waveform at 410 may have been a last set of transmission parameters used for one or more LBT procedures.

At 430, the wireless device may select a set of transmission parameters (e.g., from multiple sets of transmission parameters that have been used for previous LBT procedures). In some examples, selecting the set of transmission parameters may include comparing an interference measurement from 415 with a set of interference measurements associated with different waveforms. The wireless device may select the set of transmission parameters that resulted in the least interference (e.g., a smallest interference measurement of the set of interference measurements). At 435, the wireless device may transmit a signal using the transmission waveform associated with the selected set of transmission parameters (e.g., the wireless device may transmit a second signal using the transmission waveform associated with the selected set of transmission parameters).

Figure 5:
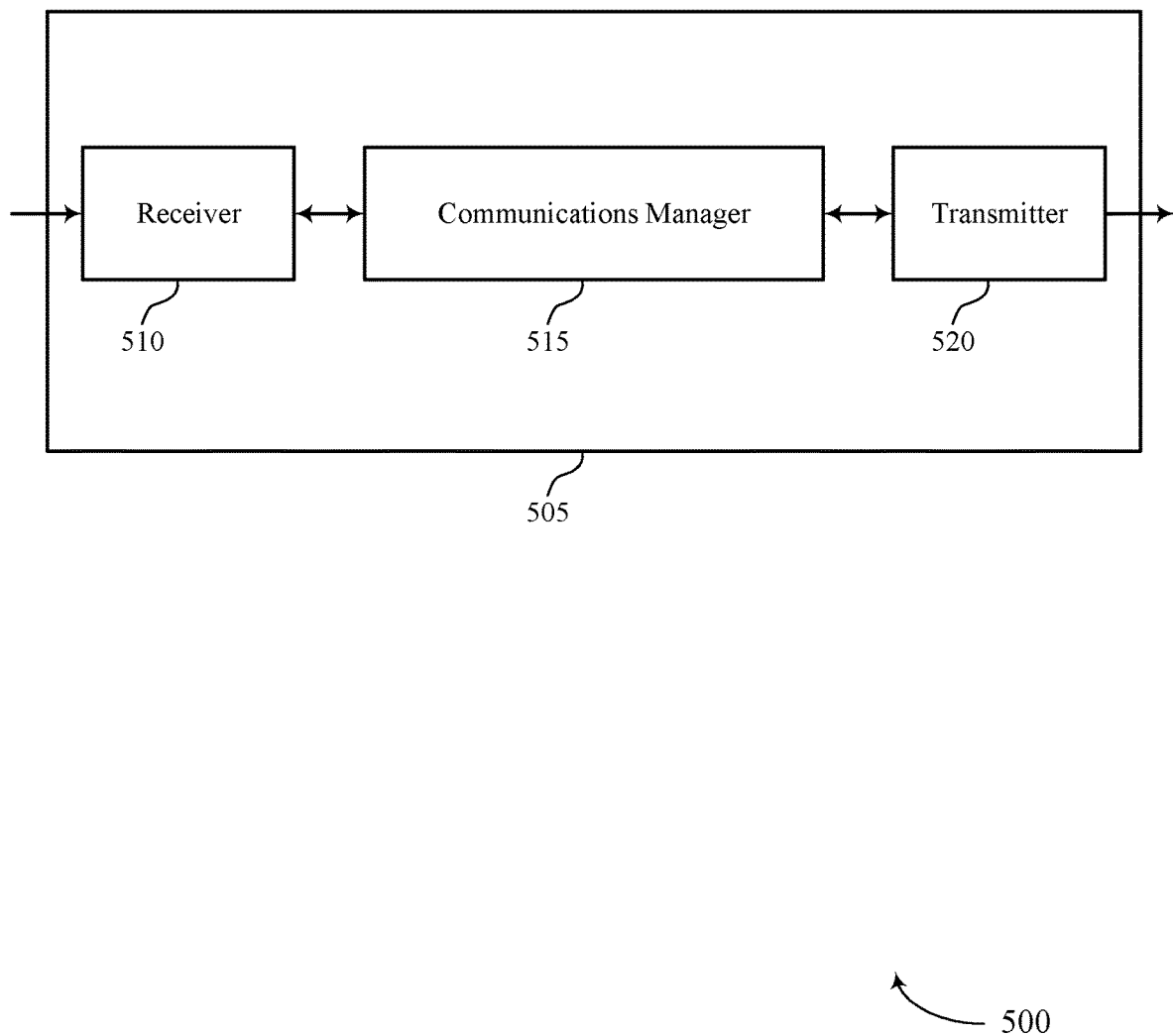
FIGS. 5 and 6 show block diagrams of devices that support techniques for LBT access mechanisms for radar systems in accordance with various aspects of the present disclosure.

FIG. 5 shows a block diagram 500 of a device 505 that supports techniques for LBT access mechanisms for radar systems in accordance with various aspects of the present disclosure. The device 505 may be an example of aspects of a wireless device (e.g., a UE 115 such as a vehicle) as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for LBT access mechanisms for radar systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may generate a first transmission waveform of a first signal on a set of radio resources based on the set of transmission parameters for transmission from the wireless device, perform a LBT using the generated first transmission waveform, and transmit a second signal based on the set of transmission parameters and a result of the LBT. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. For example, the communications manager 515 may implement one or more LBT schemes (e.g., LBT operations), for example, in a radar system. Such LBT schemes may enable a UE (e.g., a vehicle) to avoid interference in the radar system, which may result in relatively efficient communications, enhanced system performance and radar detection, among other advantages. Additionally or alternatively, the actions performed by the communications manager 515 may be implemented at a processor of the UE to realize one or more potential advantages. For example, the processor may enable the UE to utilize a relatively shorter time period for a LBT procedure based on a confidence threshold as described herein, which may reduce processing power, among other potential benefits.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
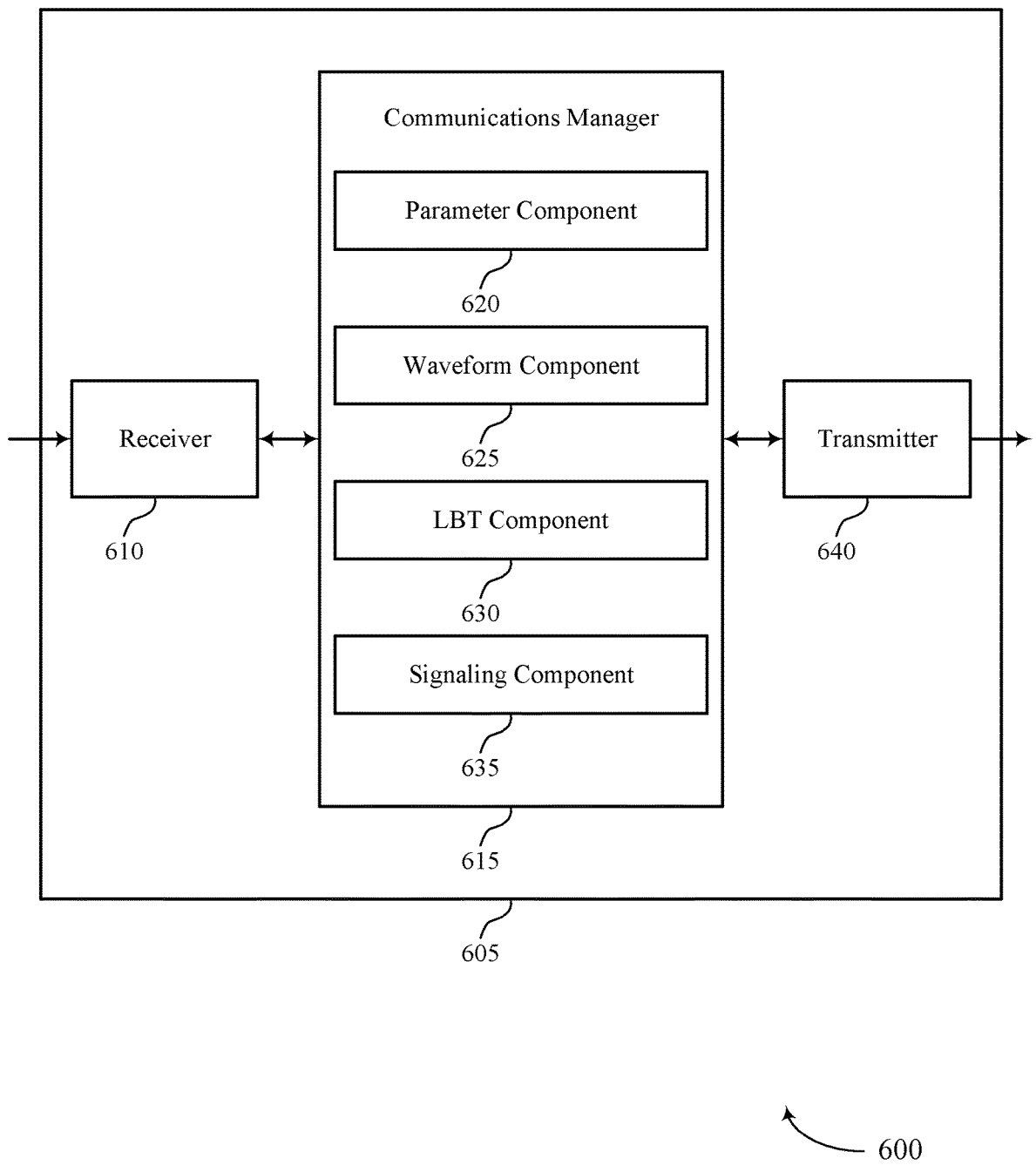

FIG. 6 shows a block diagram 600 of a device 605 that supports techniques for LBT access mechanisms for radar systems in accordance with various aspects of the present disclosure. The device 605 may be an example of aspects of a device 505, or a wireless device (e.g., a UE 115 such as a vehicle) as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for LBT access mechanisms for radar systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a parameter component 620, a waveform component 625, a LBT component 630, and a signaling component 635. The communications manager 615 may be an example of aspects of the communications manager 810 described herein.

The parameter component 620 may identify a set of transmission parameters of a first signal for transmission from the wireless device. The waveform component 625 may generate a first transmission waveform of the first signal on a set of radio resources based on the set of transmission parameters for transmission from the wireless device. The LBT component 630 may perform a LBT using the generated first transmission waveform. The signaling component 635 may transmit a second signal based on the set of transmission parameters and a result of the LBT.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
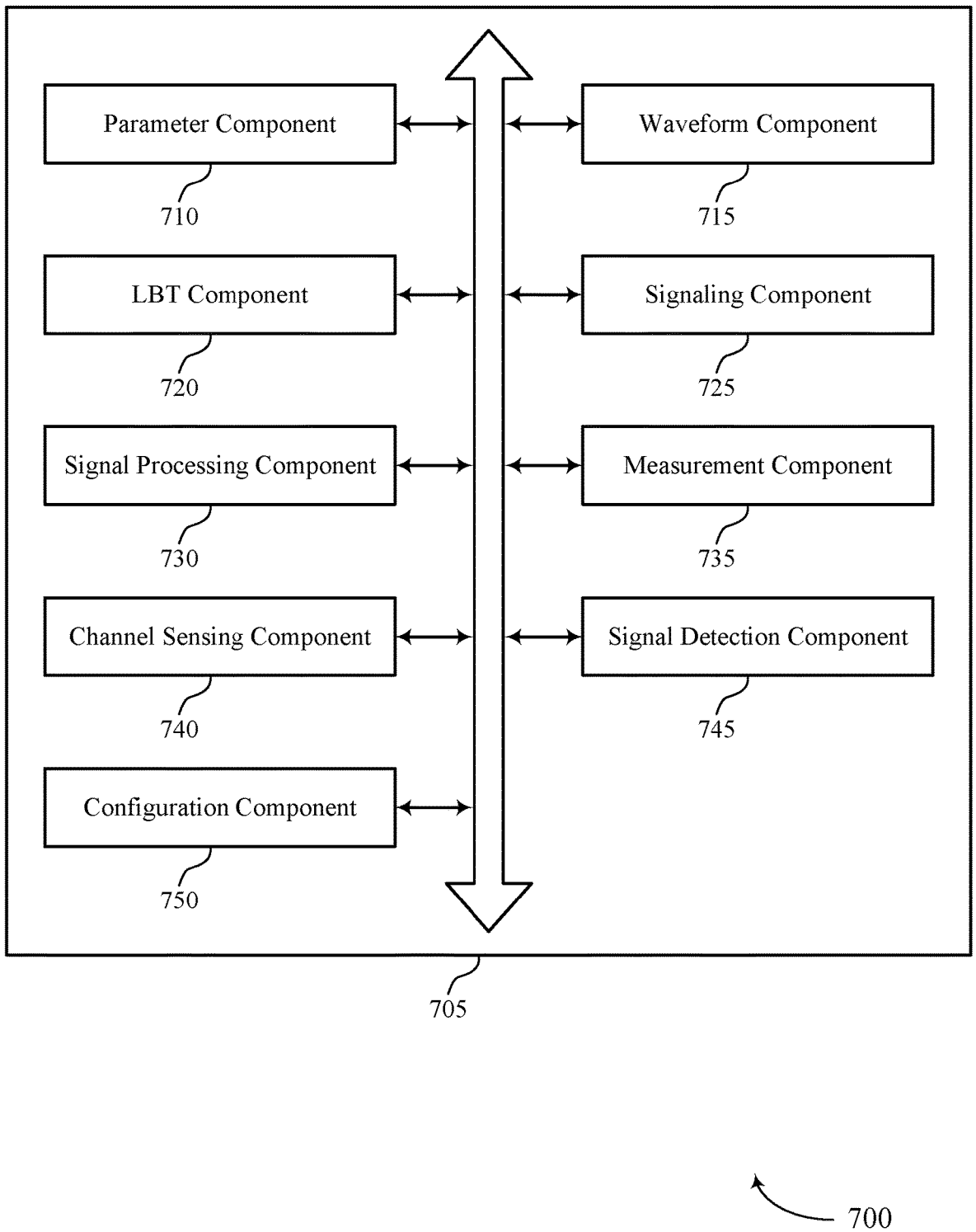
FIG. 7 shows a block diagram of a communications manager that supports techniques for LBT access mechanisms for radar systems in accordance with various aspects of the present disclosure.

FIG. 7 shows a block diagram 700 of a communications manager 705 that supports techniques for LBT access mechanisms for radar systems in accordance with various aspects of the present disclosure. The communications manager 705 may be an example of aspects of a communications manager 515, a communications manager 615, or a communications manager 810 described herein. The communications manager 705 may include a parameter component 710, a waveform component 715, a LBT component 720, a signaling component 725, a signal processing component 730, a measurement component 735, a channel sensing component 740, a signal detection component 745, and a configuration component 750. Each of these modules may communicate, directly or indirectly, with one another (e.g., via one or more buses).

The parameter component 710 may identify a set of transmission parameters of a first signal for transmission from the wireless device. In some examples, the parameter component 710 may identify a second set of transmission parameters for the first signal from the wireless device. In some examples, the parameter component 710 may select one or more transmission parameters based on the comparing. In some examples, the parameter component 710 may determine that the one or more transmission parameters correspond to a measurement that is a lowest value of the set of measurements, where selecting the one or more transmission parameters is based on the determining. In some cases, the wireless device includes a vehicle.

The waveform component 715 may generate a first transmission waveform of the first signal on a set of radio resources based on the set of transmission parameters for transmission from the wireless device. In some examples, the waveform component 715 may generate a second transmission waveform in accordance with the second set of transmission parameters.

The LBT component 720 may perform a LBT using the generated first transmission waveform. In some examples, the LBT component 720 may perform the LBT includes adjusting a detected signal associated with the set of radio resources based on the first transmission waveform. In some examples, the LBT component 720 may identify the result of the LBT based on a measurement satisfying a threshold.

In some examples, the LBT component 720 may perform a second LBT using the generated second transmission waveform, where performing the second LBT includes adjusting a detected signal associated with the set of resources based on the second transmission waveform.

The signaling component 725 may transmit the second signal based on a result of the LBT, the set of transmission parameters, or a combination thereof. In some examples, the signaling component 725 may transmit the second signal using the first transmission waveform. In some examples, the signaling component 725 may transmit the second signal using the second transmission waveform based on a successful result of the second LBT. In some examples, the signaling component 725 may transmit the second signal in accordance with the selected one or more transmission parameters. In some examples, the signaling component 725 may transmit a frequency modulated continuous wave radar signal.

The signal processing component 730 may process a detected signal and the first transmission waveform to obtain a measurement.

The measurement component 735 may compare a measurement of the LBT with a set of measurements associated with a set of LBTs. In some examples, the LBT component 720 may determine that the measurement satisfies a threshold. In some cases, the measurement is less than the threshold and the result of the LBT includes a successful result. In some cases, the measurement is greater than or equal to the threshold and the result of the LBT includes a failed result. In some cases, the set of transmission parameters is a last set of transmission parameters of a set of sets of transmission parameters.

The channel sensing component 740 may sense, during a first time period, a channel associated with the set of radio resources.

The signal detection component 745 may identify a detected signal based on sensing the channel, where performing the LBT is based on the detected signal.

The configuration component 750 may identify the first time period based on a configuration of the wireless device, information received from another wireless device, a confidence threshold, or any combination thereof.

Figure 8:
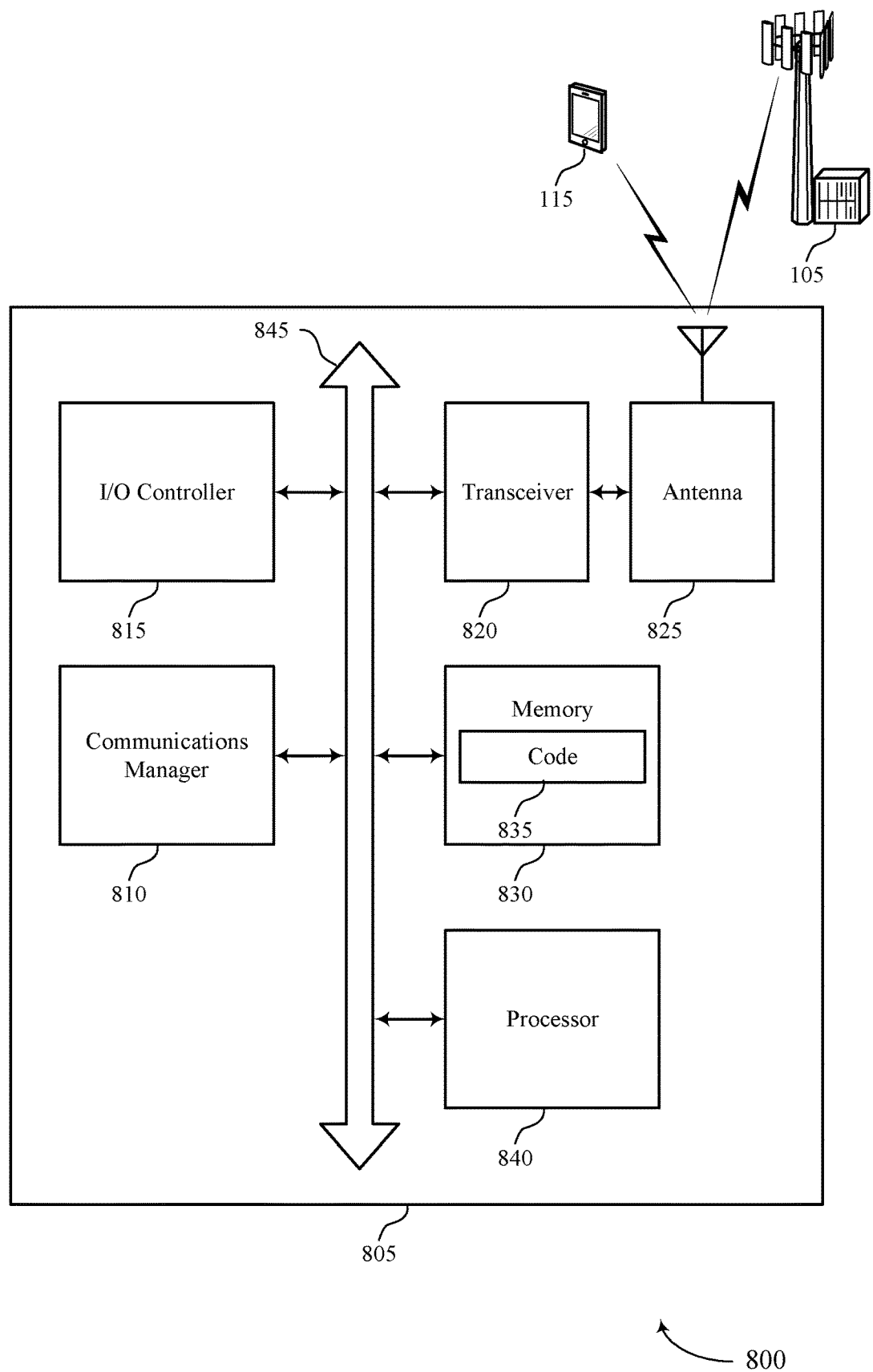
FIG. 8 shows a diagram of a system including a device that supports techniques for LBT access mechanisms for radar systems in accordance with various aspects of the present disclosure.

FIG. 8 shows a diagram of a system 800 including a device 805 that supports techniques for LBT access mechanisms for radar systems in accordance with various aspects of the present disclosure. The device 805 may be an example of or include the components of device 505, device 605, or a wireless device (e.g., a UE 115 such as a vehicle) as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may generate a first transmission waveform of a first signal on a set of radio resources based on a set of transmission parameters for transmission from the wireless device, perform a LBT using the generated first transmission waveform, and transmit the signal based on the set of transmission parameters and a result of the LBT.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for LBT access mechanisms for radar systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
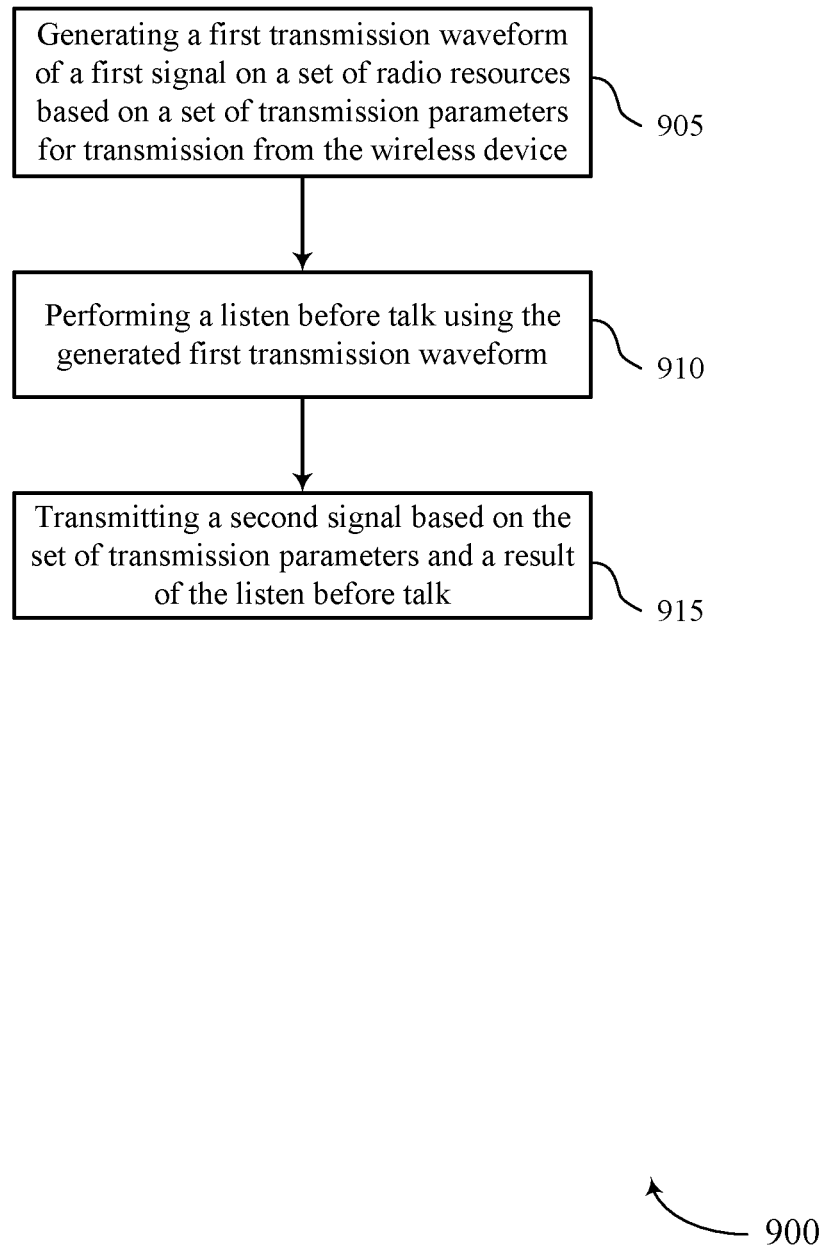
FIGS. 9 and 10 show flowcharts illustrating methods that support techniques for LBT access mechanisms for radar systems in accordance with various aspects of the present disclosure.

FIG. 9 shows a flowchart illustrating a method 900 that supports techniques for LBT access mechanisms for radar systems in accordance with various aspects of the present disclosure. The operations of method 900 may be implemented by a wireless device (e.g., a UE 115 such as a vehicle) or its components as described herein. For example, the operations of method 900 may be performed by a communications manager as described with reference to FIGS. 5 through 8. In some examples, a wireless device may execute a set of instructions to control the functional elements of the wireless device to perform the functions described herein. Additionally or alternatively, a wireless device may perform aspects of the functions described herein using special-purpose hardware.

At 905, the wireless device may generate a first transmission waveform of a first signal on a set of radio resources based on a set of transmission parameters for transmission from the wireless device. The operations of 905 may be performed according to the methods described herein. In some examples, aspects of the operations of 905 may be performed by a waveform component as described with reference to FIGS. 5 through 8.

At 910, the wireless device may perform a LBT using the generated first transmission waveform. The operations of 910 may be performed according to the methods described herein. In some examples, aspects of the operations of 910 may be performed by a LBT component as described with reference to FIGS. 5 through 8.

At 915, the wireless device may transmit a second signal based on the set of transmission parameters and a result of the LBT. The operations of 915 may be performed according to the methods described herein. In some examples, aspects of the operations of 915 may be performed by a signaling component as described with reference to FIGS. 5 through 8.

Figure 10:
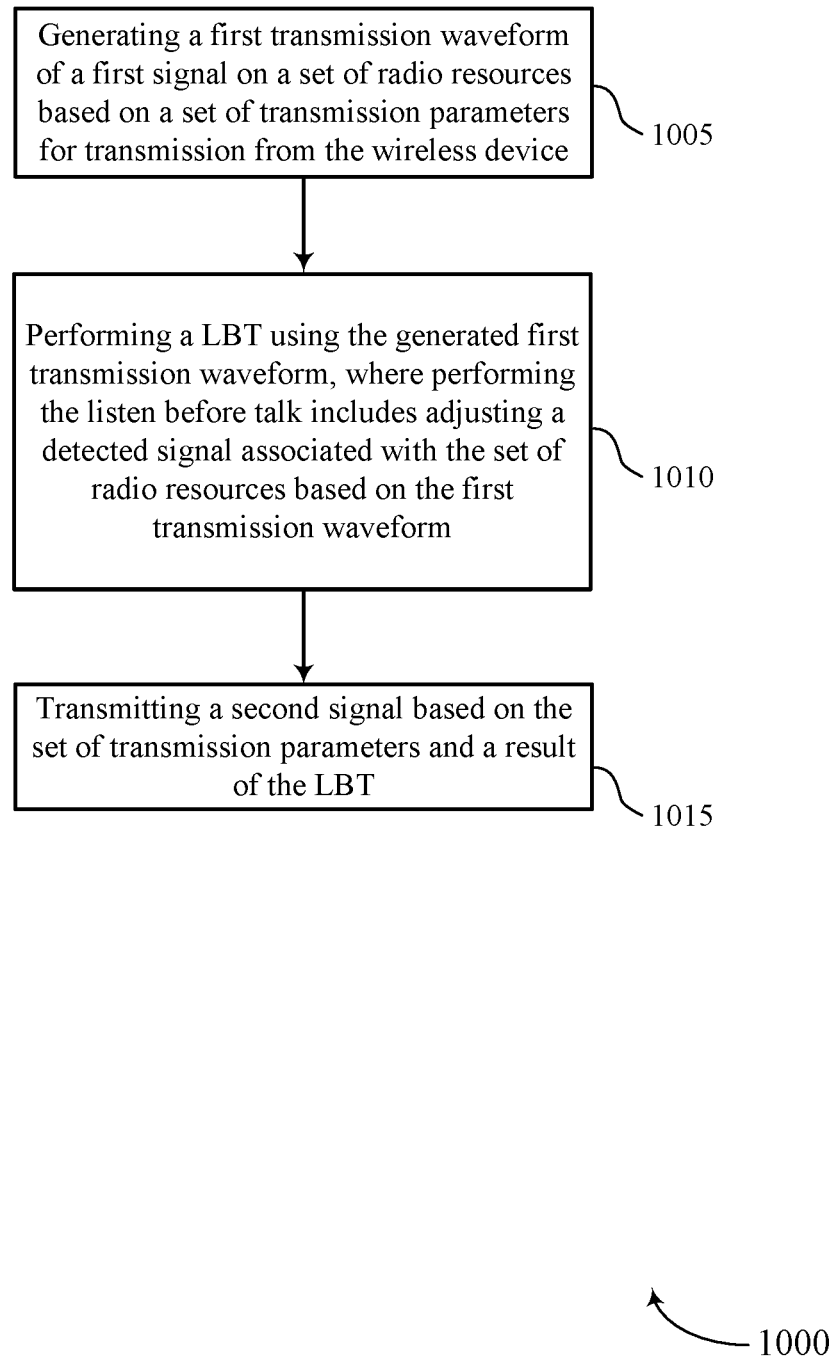

FIG. 10 shows a flowchart illustrating a method 1000 that supports techniques for LBT access mechanisms for radar systems in accordance with various aspects of the present disclosure. The operations of method 1000 may be implemented by a wireless device (e.g., a UE 115 such as a vehicle) or its components as described herein. For example, the operations of method 1000 may be performed by a communications manager as described with reference to FIGS. 5 through 8. In some examples, a wireless device may execute a set of instructions to control the functional elements of the wireless device to perform the functions described herein. Additionally or alternatively, a wireless device may perform aspects of the functions described herein using special-purpose hardware.

At 1005, the wireless device may generate a first transmission waveform of a first signal on a set of radio resources based on a set of transmission parameters for transmission from the wireless device. The operations of 1005 may be performed according to the methods described herein. In some examples, aspects of the operations of 1005 may be performed by a waveform component as described with reference to FIGS. 5 through 8.

At 1010, the wireless device may perform a LBT using the generated first transmission waveform, where the LBT includes adjusting a detected signal associated with the set of radio resources based on the first transmission waveform. The operations of 1010 may be performed according to the methods described herein. In some examples, aspects of the operations of 1010 may be performed by a LBT component as described with reference to FIGS. 5 through 8.

At 1015, the wireless device may transmit a second signal based on the set of transmission parameters and a result of the LBT. The operations of 1015 may be performed according to the methods described herein. In some examples, aspects of the operations of 1015 may be performed by a signaling component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a wireless device, comprising: generating a first transmission waveform of a first signal on a set of radio resources based at least in part on a set of transmission parameters for transmission from the wireless device; performing a LBT using the generated first transmission waveform; and transmitting a second signal based at least in part on the set of transmission parameters and a result of the LBT.

Aspect 2: The method of aspect 1, wherein performing the LBT includes adjusting a detected signal associated with the set of radio resources based at least in part on the first transmission waveform.

Aspect 3: The method of any of aspects 1 through 2, further comprising: processing a detected signal and the first transmission waveform to obtain a measurement; determining that the measurement satisfies a threshold; and identifying the result of the LBT based at least in part on the measurement satisfying the threshold.

Aspect 4: The method of aspect 3, wherein the measurement is less than the threshold and the result of the LBT comprises a successful result.

Aspect 5: The method of any of aspects 3 through 4, wherein the measurement is greater than or equal to the threshold and the result of the LBT comprises a failed result.

Aspect 6: The method of any of aspects 1 through 5, wherein the result of the LBT is a successful result, further comprising: transmitting the second signal using the first transmission waveform.

Aspect 7: The method of any of aspects 1 through 6, wherein the result of the LBT is a failed result, further comprising: identifying a second set of transmission parameters for the first signal from the wireless device; generating a second transmission waveform in accordance with the second set of transmission parameters; performing a second LBT based at least in part on generating the second transmission waveform, wherein performing the second LBT includes adjusting a detected signal associated with the set of radio resources based at least in part on the second transmission waveform; and transmitting the second signal using the second transmission waveform based at least in part on a successful result of the second LBT.

Aspect 8: The method of any of aspects 1 through 7, wherein the result of the LBT is a failed result, further comprising: comparing a measurement of the LBT with a set of measurements associated with a set of LBTs; selecting one or more transmission parameters based at least in part on the comparing; and transmitting the second signal in accordance with the selected one or more transmission parameters.

Aspect 9: The method of aspect 8, further comprising: determining that the one or more transmission parameters correspond to a measurement that is a lowest value of the set of measurements, wherein selecting the one or more transmission parameters is based at least in part on the determining.

Aspect 10: The method of any of aspects 8 through 9, wherein the set of transmission parameters is a last set of transmission parameters of a plurality of sets of transmission parameters.

Aspect 11: The method of any of aspects 1 through 10, wherein performing the LBT comprises: sensing, during a first time period, a channel associated with the set of radio resources; and identifying a detected signal based at least in part on sensing the channel, wherein performing the LBT is based at least in part on the detected signal.

Aspect 12: The method of aspect 11, further comprising: identifying the first time period based at least in part on a configuration of the wireless device, information received from another wireless device, a confidence threshold, or any combination thereof.

Aspect 13: The method of any of aspects 1 through 12, wherein transmitting the second signal comprises: transmitting a frequency modulated continuous wave radar signal.

Aspect 14: The method of any of aspects 1 through 13, wherein the wireless device comprises a vehicle.

Aspect 15: An apparatus for wireless communications at a wireless device, comprising a processor; memory coupled with the processor; and instructions stored in the memory and executable by the processor to cause the apparatus to perform a method of any of aspects 1 through 14.

Aspect 16: An apparatus for wireless communications at a wireless device, comprising at least one means for performing a method of any of aspects 1 through 14.

Aspect 17: A non-transitory computer-readable medium storing code for wireless communications at a wireless device, the code comprising instructions executable by a processor to perform a method of any of aspects 1 through 14.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a wireless device, comprising:
  generating a first transmission waveform of a first signal on a set of radio resources based at least in part on a set of transmission parameters for transmission from the wireless device;

identifying, during a first time period, a received energy of a detected signal associated with the set of radio resources of a channel;
adjusting the received energy of the detected signal based on the first transmission waveform;
determining a measurement of interference between the first signal and the detected signal based at least in part on the adjusted received energy; and
transmitting a second signal based at least in part on the set of transmission parameters and the measurement of interference.

2. The method of claim 1, wherein:
adjusting the received energy based on the first transmission waveform includes mixing the generated first transmission waveform with the received energy.

3. The method of claim 1, further comprising:
determining that the measurement satisfies a threshold.

4. The method of claim 3, wherein the measurement is less than the threshold.

5. The method of claim 4, further comprising:
transmitting the second signal using the first transmission waveform.

6. The method of claim 3, wherein the measurement is greater than or equal to the threshold.

7. The method of claim 6, further comprising:
identifying a second set of transmission parameters for the first signal from the wireless device;
generating a second transmission waveform in accordance with the second set of transmission parameters;
determining a second measurement based at least in part on adjusting the received energy based at least in part on the second transmission waveform; and
transmitting the second signal using the second transmission waveform based at least in part on the second measurement satisfying the threshold.

8. The method of claim 1, further comprising:
comparing the measurement with a set of measurements associated with a set of transmission waveforms;
selecting one or more transmission parameters based at least in part on the comparing; and
transmitting the second signal in accordance with the selected one or more transmission parameters.

9. The method of claim 8, further comprising:
determining that the one or more transmission parameters correspond to a measurement that is a lowest value of the set of measurements, wherein selecting the one or more transmission parameters is based at least in part on the determining.

10. The method of claim 8, wherein the set of transmission parameters is a last set of transmission parameters of a plurality of sets of transmission parameters.

11. The method of claim 1, further comprising:
identifying the first time period based at least in part on a configuration of the wireless device, information received from another wireless device, a confidence threshold, or any combination thereof.

12. The method of claim 1, wherein transmitting the second signal comprises:
transmitting a frequency modulated continuous wave radar signal.

13. The method of claim 1, wherein the wireless device comprises a vehicle.

14. An apparatus for wireless communications at a wireless device, comprising:
a processor,
memory coupled with the processor; and
instructions stored in the memory and executable by the processor to cause the apparatus to:
generate a first transmission waveform of a first signal on a set of radio resources based at least in part on a set of transmission parameters for transmission from the wireless device;
identify, during a first time period, a received energy of a detected signal associated with the set of radio resources of a channel;
adjust the received energy of the detected signal based on the first transmission waveform;
determine a measurement of interference between the first signal and the detected signal based at least in part on the adjusted received energy; and
transmit a second signal based at least in part on the set of transmission parameters and the measurement of interference.

15. The apparatus of claim 14, wherein to adjust the received energy based on the first transmission waveform includes mixing the generated first transmission waveform with the received energy.

16. The apparatus of claim 14, wherein the instructions are further executable by the processor to cause the apparatus to:
determine that the measurement satisfies a threshold.

17. The apparatus of claim 16, wherein the measurement is less than the threshold.

18. The apparatus of claim 17, wherein the instructions are further executable by the processor to cause the apparatus to: transmit the second signal using the first transmission waveform.

19. The apparatus of claim 16, wherein the measurement is greater than or equal to the threshold.

20. The apparatus of claim 19, wherein the instructions are further executable by the processor to cause the apparatus to:
identify a second set of transmission parameters for the first signal from the wireless device;
generate a second transmission waveform in accordance with the second set of transmission parameters;
determine perform a second measurement based at least in part on adjusting the received energy based at least in part on the second transmission waveform; and
transmit the second signal using the second transmission waveform based at least in part on the second measurement satisfying the threshold.

21. The apparatus of claim 14, wherein the instructions are further executable by the processor to cause the apparatus to:
compare the measurement with a set of measurements associated with a set of transmission waveforms;
select one or more transmission parameters based at least in part on the comparing; and
transmit the second signal in accordance with the selected one or more transmission parameters.

22. The apparatus of claim 21, wherein the instructions are further executable by the processor to cause the apparatus to:
determine that the one or more transmission parameters correspond to a measurement that is a lowest value of the set of measurements, wherein selecting the one or more transmission parameters is based at least in part on the determining.

23. The apparatus of claim 21, wherein the set of transmission parameters is a last set of transmission parameters of a plurality of sets of transmission parameters.

24. The apparatus of claim 14, wherein the instructions are further executable by the processor to cause the apparatus to:
    identify the first time period based at least in part on a configuration of the wireless device, information received from another wireless device, a confidence threshold, or any combination thereof.

25. The apparatus of claim 14, wherein the instructions to transmit the second signal are executable by the processor to cause the apparatus to:
    transmit a frequency modulated continuous wave radar signal.

26. The apparatus of claim 14, wherein the wireless device comprises a vehicle.

27. An apparatus for wireless communications at a wireless device, comprising:
    means for generating a first transmission waveform of a first signal on a set of radio resources based at least in part on a set of transmission parameters for transmission from the wireless device;
    means for identifying, during a first time period, a received energy of a detected signal associated with the set of radio resources of a channel;
    means for adjusting the received energy of the detected signal based on the first transmission waveform;
    means for determining a measurement of interference between the first signal and the detected signal based at least in part on the adjusted received energy; and
    means for transmitting a second signal based at least in part on the set of transmission parameters and the measurement of interference.

28. A non-transitory computer-readable medium storing code for wireless communications at a wireless device, the code comprising instructions executable by a processor to:
    generate a first transmission waveform of a first signal on a set of radio resources based at least in part on a set of transmission parameters for transmission from the wireless device;
    identify, during a first time period, a received energy of a detected signal associated with the set of radio resources of a channel;
    adjust the received energy of the detected signal based on the first transmission waveform;
    determine a measurement of interference between the first signal and the detected signal based at least in part on the adjusted received energy; and
    transmit a second signal based at least in part on the set of transmission parameters and the measurement of interference.

* * * * *